United States Patent
Bucknell et al.

(10) Patent No.: US 9,684,506 B2
(45) Date of Patent: Jun. 20, 2017

(54) WORK-ITEM EXPIRATION IN SOFTWARE CONFIGURATION MANAGEMENT ENVIRONMENT

(71) Applicant: International Business Machines Corporation, Armonk, NY (US)

(72) Inventors: Graham R. Bucknell, Frenchs Forest (AU); Philip S. P. Chan, Marrickville (AU); Laurence A. Hey, Manly (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/934,190

(22) Filed: Nov. 6, 2015

(65) Prior Publication Data

US 2017/0131998 A1    May 11, 2017

(51) Int. Cl.
    G06F 9/44    (2006.01)
(52) U.S. Cl.
    CPC ..................... G06F 8/70 (2013.01)
(58) Field of Classification Search
    CPC .......................................... G06F 8/70
    See application file for complete search history.

(56) References Cited

U.S. PATENT DOCUMENTS

| | | | | |
|---|---|---|---|---|
| 6,029,175 A | * | 2/2000 | Chow | G06F 17/30899 |
| 7,131,112 B1 | | 10/2006 | Bartz et al. | |
| 7,299,450 B2 | * | 11/2007 | Livshits | G06F 8/71 |
| | | | | 717/121 |
| 2004/0260974 A1 | * | 12/2004 | Livshits | G06F 8/71 |
| | | | | 714/19 |
| 2006/0206866 A1 | * | 9/2006 | Eldrige | G05B 15/02 |
| | | | | 717/122 |
| 2007/0006150 A9 | * | 1/2007 | Walmsley | B41J 2/04505 |
| | | | | 717/120 |
| 2007/0067766 A1 | * | 3/2007 | Tal | G06F 8/65 |
| | | | | 717/168 |
| 2009/0125128 A1 | * | 5/2009 | Eldridge | G05B 15/02 |
| | | | | 700/86 |
| 2012/0102153 A1 | * | 4/2012 | Kemp | G06F 17/3051 |
| | | | | 709/219 |

(Continued)

OTHER PUBLICATIONS

IBM®, "Creating and managing change sets", IBM Knowledge Center, p. 1, printed on Jul. 10, 2015, <http://www-01.ibm.com/support/knowledgecenter/SS2LT6_2.0.0/com.ibm.team.scm.doc/topics/t_scm_eclipse_csets.html>.

(Continued)

*Primary Examiner* — Chameli Das
(74) *Attorney, Agent, or Firm* — Erik K. Johnson

(57) ABSTRACT

A first changeset that identifies a change to a first software product development file is generated. An expiry condition to assign to the first changeset is received. Responsive to determining that the expiry condition assigned to the first changeset is met, whether any subsequent changesets identify another change that depends on the change to the first software product development file identified in the first changeset is determined. Responsive to determining that no subsequent changesets identify another change that depends on the change to the first software product development file identified in the first changeset, the change identified in the first changeset, such that the first software product development file does not include the change identified in the first changeset is automatically reversed.

20 Claims, 6 Drawing Sheets

(56) References Cited

U.S. PATENT DOCUMENTS

| | | |
|---|---|---|
| 2014/0215436 A1 | 7/2014 | DeLuca et al. |
| 2014/0298290 A1 | 10/2014 | Klinger |
| 2014/0372989 A1 | 12/2014 | Shani et al. |
| 2015/0121334 A1 | 4/2015 | Bantupalli |
| 2015/0358206 A1* | 12/2015 | Cudak ................ H04L 41/0816 709/223 |
| 2015/0379061 A1* | 12/2015 | Paraschivescu .. G06F 17/30551 707/695 |
| 2016/0154645 A1* | 6/2016 | Chou ........................ G06F 8/71 717/121 |

OTHER PUBLICATIONS

Mell et al., "The NIST Definition of Cloud Computing," National Institute of Standards and Technology, U.S Department of Commerce, Special Publication 800-145, Sep. 2011, pp. 1-7.

* cited by examiner

WORK-ITEM EXPIRATION IN SOFTWARE CONFIGURATION MANAGEMENT ENVIRONMENT

BACKGROUND OF THE INVENTION

The present invention relates generally to the field of software product development, and more particularly to implementing a software configuration management (SCM) environment to manage source code changes for software products in development.

SUMMARY

Embodiments of the present invention disclose a method, a computer system, and computer program products for managing changes made to software product development files in a source control management (SCM) environment. A first changeset that identifies a change to a first software product development file is generated. An expiry condition to assign to the first changeset is received. Responsive to determining that the expiry condition assigned to the first changeset is met, whether any subsequent changesets identify another change that depends on the change to the first software product development file identified in the first changeset is determined. Responsive to determining that no subsequent changesets identify another change that depends on the change to the first software product development file identified in the first changeset, the change identified in the first changeset, such that the first software product development file does not include the change identified in the first changeset is automatically reversed.

DETAILED DESCRIPTION

Figure 1:
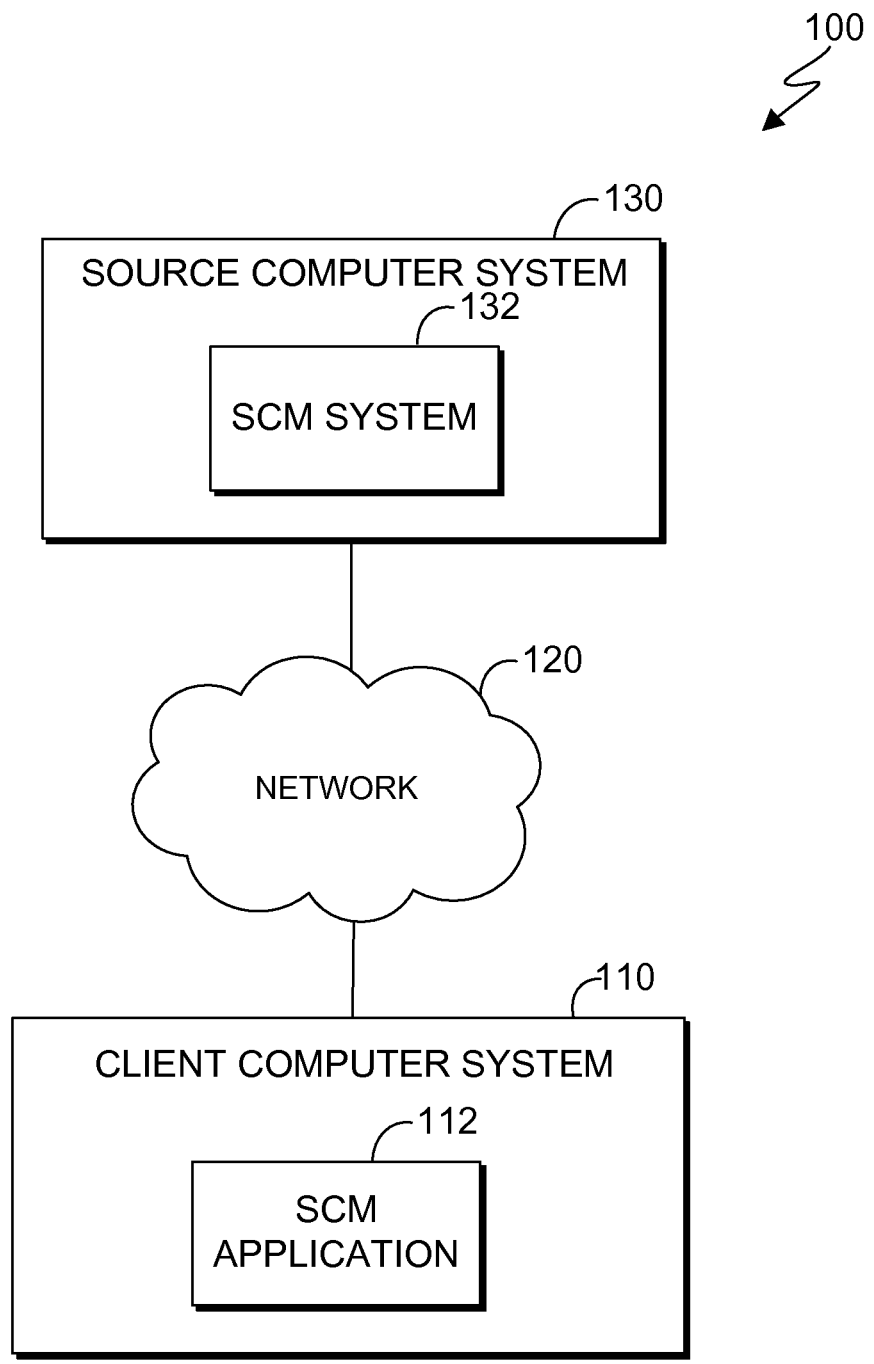
FIG. 1 is a functional block diagram illustrating an SCM environment, in accordance with one embodiment of the present invention.

Members of a software product development team may work on numerous files for a software product in development that result in one or more versions of documents, configuration code, and source code. A software configuration management (SCM) environment may manage changes made to software product development files. Upon completion of the software product in development, the software product may be released as a software product deliverable.

A member of the software product development team may make one or more changes to a software product development file. The one or more changes made to a software product development files can be grouped into a "changeset." A changeset can include one or more changes to the contents of individual software product development files and changes to a component namespace (e.g., delete, rename, and move operations). A changeset might modify a few lines in a single software product development file or can include changes to the contents of a many software product development files, changes to file names, folder names, and folder contents. Changesets enable atomicity of related changes made to the software product development files by grouping related changes that are applied as a unit to the files of a software product in development.

Changesets created by a member of the software product development team can be delivered to source computer systems, such that other members of the product development team can access software product development files that include changes identified in the changesets. The SCM environment and components therein may implement a delivery phase and reversal phase to manage changesets. For example, a member of a software product development team may deliver a first changeset that identifies changes made to a module of a software product as a proposed solution for an issue encountered in the software product in development. At a later time, a second changeset may be delivered that identifies changes made to software development files of the module. Accordingly, a member of the software development team can be notified to help manage changes made to the module. In another example, a member of a software product development team may deliver a first changeset and it may be determined that a second changeset identifies changes made to software product development files that depend on changes identified in the first changeset. Stated differently, identifying a dependent change involves determining whether subsequent changesets identify the other change to another software product development file that uses information from the change identified by the first changeset. Accordingly, a member of the software development team can be notified to help manage changes made.

"Work-items" can be assigned to members of the software product development team and can be associated "work-item states". Work-items enable members and management of the software product development team to more easily track progress on their respective tasks pertaining to the software product in development. For example, a member of a software product development team may deliver a changeset in accordance to an assigned work-item.

In embodiments of the invention, a changeset associated with a work-item may be assigned expiry conditions that trigger an expiration of the changeset. For example, an expiry condition may specify to expire a changeset after a time duration has been reached (e.g., expire the changeset after two weeks), after a test in a continuous integration system passes, after another similar or related work-item is completed, after another related or similar work-item or changeset is delivered, or combinations thereof. Defining expiry conditions enables components of the SCM environment to automatically reverse the changeset. Responsive to an expiry condition, work-items may be assigned an expiration state, or an expiry pending state, such that work-items that are assigned an expiration state are marked closed in the SCM environment. Expiring a changeset for a work-item may ensure that the changeset is not part of a software product deliverable, or may ensure that a member of the software product development team that submitted the changeset confirms that the changeset should be a part of the software product deliverable.

FIG. 1 is a functional block diagram illustrating SCM environment 100, in accordance with one embodiment of the present invention. SCM environment 100 includes client computer system 110 and source computer system 130 connected over network 120. Client computer system 110 and source computer system 130 can be desktop computers, laptop computers, specialized computer servers, or other computer systems, in accordance with embodiments of the invention. In certain embodiments, client computer system 110 and source computer system 130 represent one or more computer systems utilizing clustered computers and components to act as a single pool of seamless resources when accessed through network 120. In general, client computer system 110 and source computer system 130 are representative of any electronic devices, or combination of electronic devices, capable of executing machine-readable program instructions, as described in greater detail with regard to FIG. 4. In other embodiments, client computer system 110 and source computer system 130 may be implemented in a cloud computing environment, as described in greater detail with regard to FIGS. 5 and 6. SCM environment 100 may be implemented in a cloud computing environment, as described in greater detail with regard to FIGS. 5 and 6.

Network 120 may be, for example, a local area network (LAN), a wide area network (WAN) such as the Internet, or a combination of the two, and can include wired, wireless, or fiber optic connections. In general, network 120 can be any combination of connections and protocols that will support communications between client computer system 110 and source computer system 130, in accordance with an embodiment of the present invention.

Client computer system 110 represents a platform on which software product development team members access SCM system 132 on source computer system 130, described in more detail below. In one embodiment, client computer system 110 includes SCM application 112. A member of a software product development team may operate client computer system 110 to, for example, download a software development file from SCM system 132, make changes to the file in accordance with a work-item, and upload the modified file and an associated generated changeset to SCM system 132. A development team member may also review changes made by other members of the development team via, for example, a specialized graphical user interface, or by downloading and examining changesets generated by the other team members. Accordingly, one or more members of the software product development team can use client computer system 110 to interact with (e.g., view, modify, receive, submit, etc.) software product development files.

SCM application 112 represents a developer interface to support interactions between the developer and SCM system 132. In one embodiment, SCM application 112 may include one or more software programs and graphical user interfaces enabling users of client computer system 110, for example, a member of a software development team, to access, manage, and modify software product development files controlled by SCM system 132. For example, a member of a software product development team may receive software product development files from SCM system 132 using SCM application 112. The member of the software product development team can download and make changes to the software product development files and deliver the modified software product development files and associated changesets back to SCM system 132. SCM application 112 may associate a changeset with an expiry conditions, as described in greater detail with regard to FIG. 2.

Source computer system 130 represents a platform for storing and managing delivered software product development files. In one embodiment, source computer system 130 includes SCM system 132. SCM system 132 represents a platform used to integrate software product development files that are modified in SCM application 112. For example, there may be five team members of a software product development team. In this example, each of the five team members may use their own respective client computer system 110 and deliver their own changes to SCM system 132. Each of the five team members may accept changes from other team members from SCM system 132. In another embodiment, SCM system 132 represents a current state of a development effort for a software product development team (i.e., stable source of shared artifacts between team members). SCM system 132 may be configured to operate with process controls, such as, requiring changes to software product development files to be free of compilation errors, or reviewed and approved by other team members before delivery. In yet another embodiment, SCM system 132 may include one or more components that can manage changesets of files for a software product in development. For example, SCM system 132 may implement control logic to expire delivered changesets in source computer system 130 and components therein, responsive to an expiry condition, as described in greater detail with regard to FIGS. 2 and 3.

Embodiments of the invention are described with respect to the components and their functionality as presented in FIG. 1. Other embodiments of the invention may perform the invention as claimed with different functional boundaries between components. For example, the functionality of SCM system 132 and SCM application 112 may be implemented as standalone components, or may be incorporated as a function of source computer system 130 and/or client computer system 110.

Figure 2:
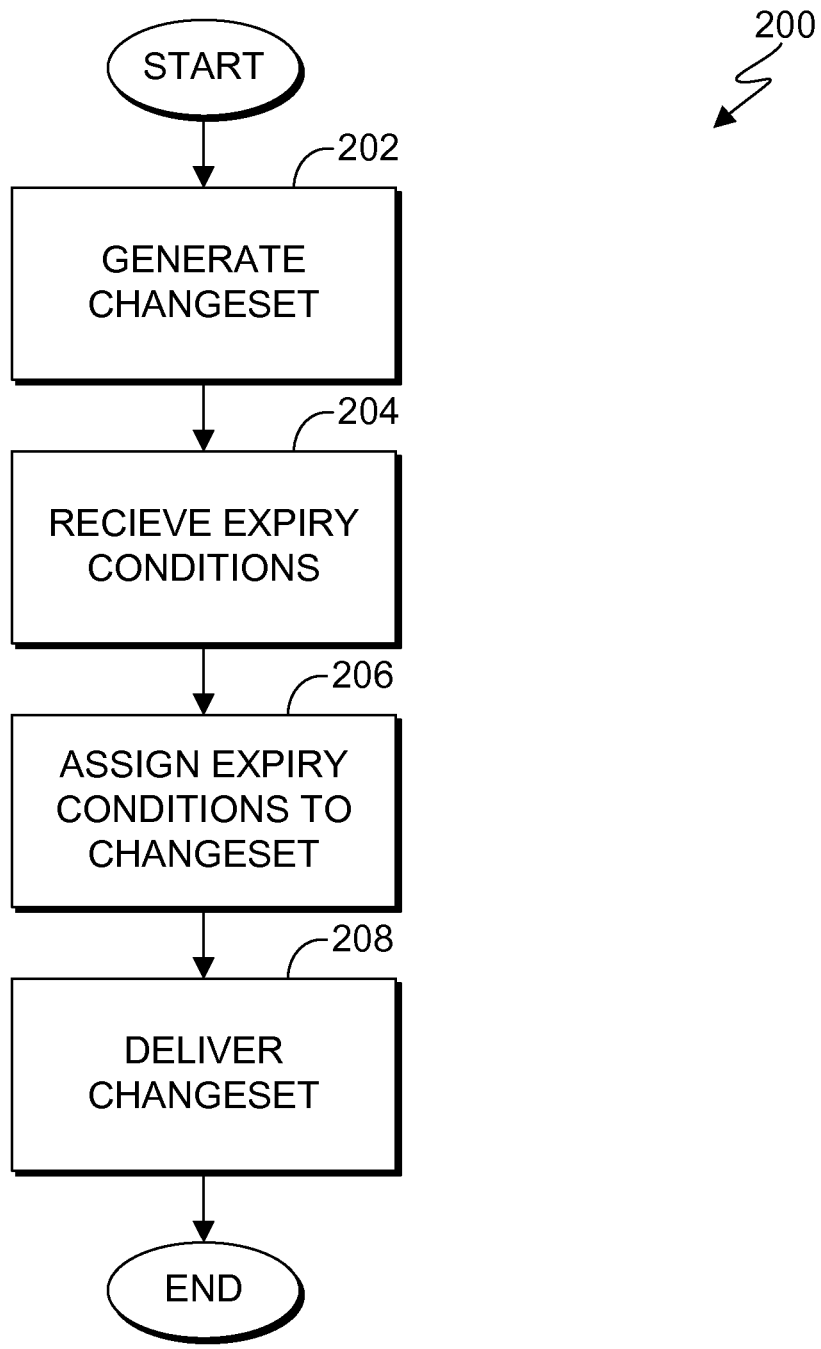
FIG. 2 is a flowchart illustrating operational steps of a SCM application performing a delivery phase, in accordance with an embodiment of the present invention.

FIG. 2 is a flowchart 200 illustrating operational steps of SCM application 112 for performing a delivery phase, in accordance with an embodiment of the present invention. In one embodiment, SCM application 112 may perform operational steps described herein, to associate a changeset with an expiring workflow and expiry conditions. SCM application 112 performs the delivery phase to deliver to SCM system 132 a changeset assigned to an expiry condition and an expiring work-item. Accordingly, SCM system 132 can manage (i.e., expire) changesets delivered to SCM system 132 by SCM application 112.

SCM application 112 generates a changeset containing one or more changes to files of a software product in development (step 202). For example, SCM application 112 may generate a changeset after a member of a software product development team makes one or more changes to contents of the files of the software product in development. Then, SCM application 112 receives an expiry condition for the changeset from, for example, a member of a software product development team (step 204). For example, the expiry condition may involve expiring a changeset after a time duration has been reached (e.g., expire the work-item after the work-item has been in SCM system 132 for more than two weeks), after a test in a continuous integration system passes, after another similar or related work item is completed, after another related or similar work-item or changeset is delivered, or combinations thereof.

SCM application 112 assigns the expiry condition to the changeset (step 206). Then, SCM application 112 delivers the changeset to SCM system 132 (step 208). In one embodiment, the delivered changeset includes the assigned expiry conditions and assigned expiring work-item. For example, SCM application 112 may assign an expiry condition and an expiring work-item to a changeset.

Figure 3:
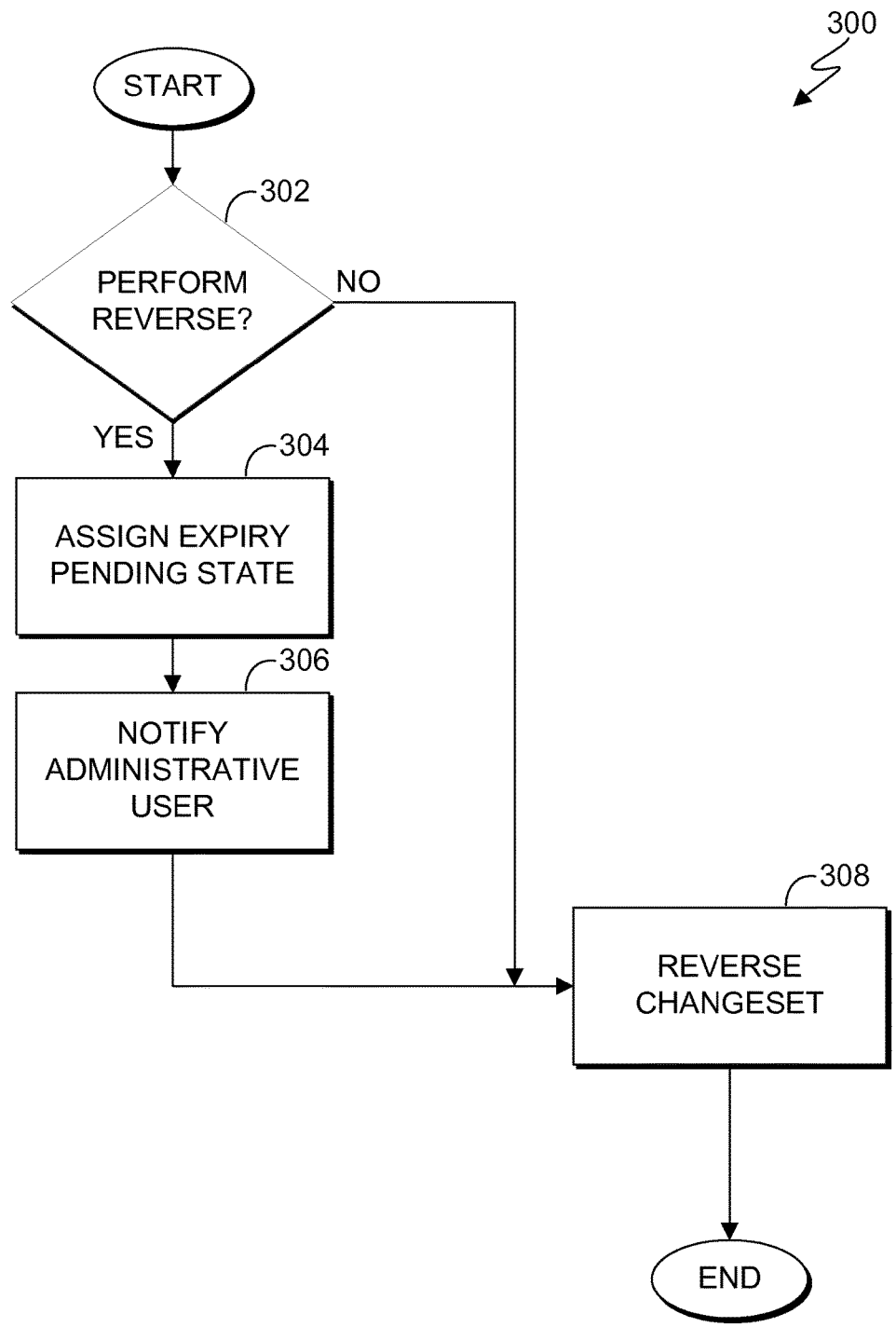
FIG. 3 is a flowchart illustrating operational steps of a SCM application performing a reversal phase, in accordance with an embodiment of the present invention.

FIG. 3 is a flowchart 300 illustrating operational steps of SCM system 132 for performing a reversal phase, in accordance with an embodiment of the present invention. In this embodiment, an expiry condition associated with a changeset delivered to SCM system 132 is met. As previously discussed, an expiry condition can be met after a time duration has been reached, after a test in a continuous integration system passes, after another similar or related work item is completed, after another related or similar work-item or changeset is delivered, or combinations thereof.

SCM system 132 determines whether SCM system 132 is able to automatically reverse the expiring changeset (decision 302). In one embodiment, SCM system 132 determines whether SCM system 132 is able to automatically reverse changes identified by the expiring changeset if SCM system 132 cannot identify additional changes to the software product files identified in a changeset delivered at a later time. In another embodiment, SCM system 132 determines whether SCM system 132 is able to automatically reverse changes identified by the expiring changeset if SCM system determines that no portion of the software product development files is dependent on the changes identified by the first expiring changeset.

If in decision 302, SCM system 132 determines that SCM system 132 is not able to reverse the expiring changeset, then SCM system 132 assigns an expiry pending state to the work-item of the expiring changeset (step 304, 'yes' branch). In one embodiment, the expiry pending state ensures that a changeset is not part of a software product deliverable, or ensures that a member of the software product development team that submitted the changeset confirms that the changeset should be a part of the software product deliverable. In another embodiment, SCM system 132 may identify a changeset delivered to SCM system 132 that triggered an expiry condition for a previously delivered changeset. In this instance, SCM system 132 may prevent delivery of one or more changesets that are delivered subsequent to the identified changeset that triggered the expiry condition for the previously delivered changeset. If in decision 302, SCM system 132 determines that SCM system 132 is able to reverse the expiring changeset, then SCM system 132 automitcally reverses the changes identified by the expiring changeset (step 308, 'no' branch). As previously described, reversing a changeset involves merging another changeset that removes changes identified by the expiring changeset.

Subsequent to assigning an expiry pending state to the work-item of the expiring changeset, SCM system 132 notifies an administrative user of source computer system 130 of a required reversal (step 306) for the expiring changeset. In one embodiment, an administrative user can be notified by SCM system 132 to reverse the one or more changes made to software product development files identified by the expiring changeset. Accordingly, an administrative user reverses the changes identified by the expiring changeset by merging another changeset.

Once a merge is successfully performed by the administrative user, SCM system 132 indicates that the reversal phase is complete (step 308). As previously discussed, responsive to determining that SCM system 132 is able to perform a reverse, SCM system 132 can automatically reverse changes made to software product development files identified by the expiring changeset without notifying an administrative user. In one embodiment, a work-item assigned to the expiring changeset is assigned a complete state by SCM system 132.

Figure 4:
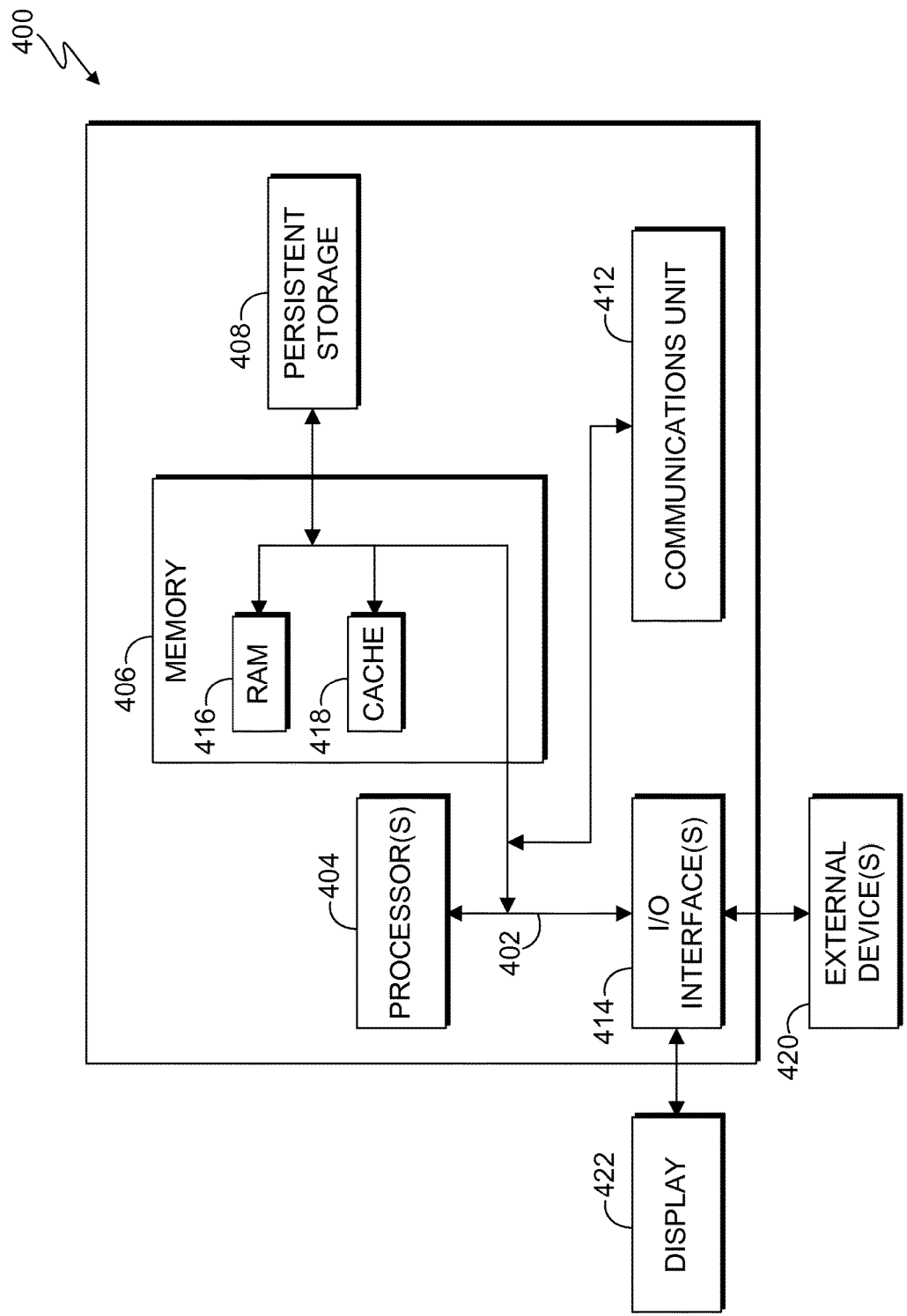
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420, such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

Figure 5:
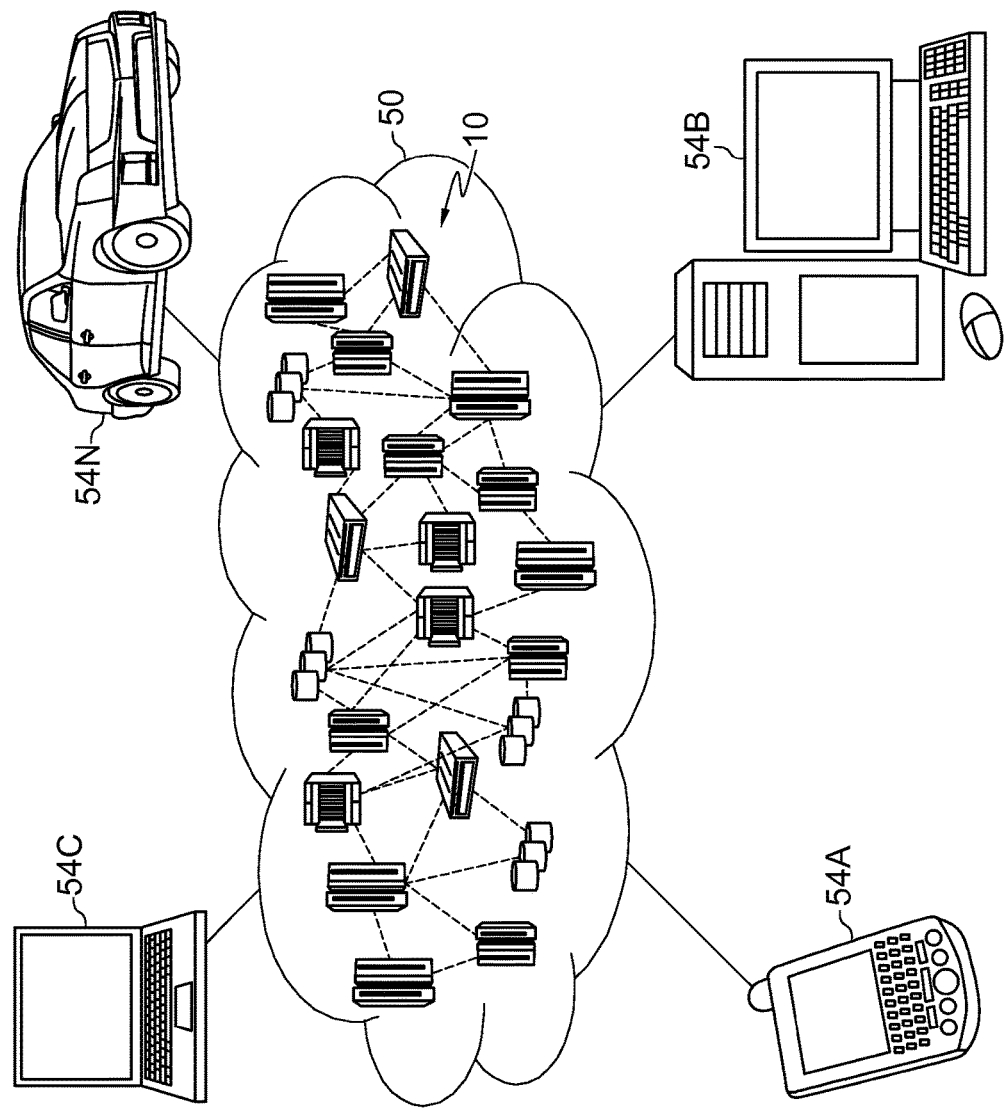
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 6:
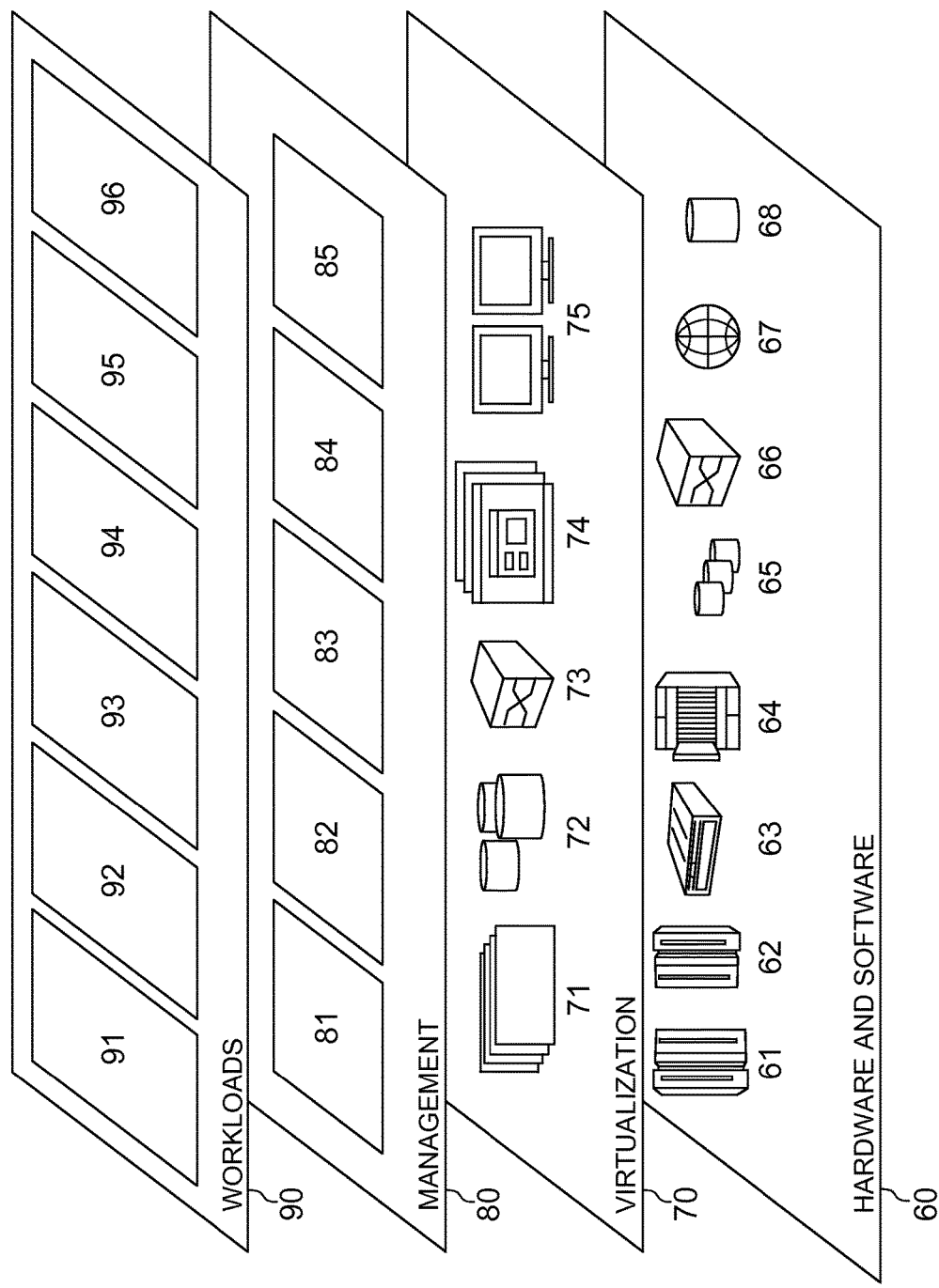
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SCM environment system 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

What is claimed is:

1. A method for managing changes made to software product development files in a source control management (SCM) environment, the method of comprising:
   generating, by one or more computer processors, a first changeset that identifies a first change to a software product development file;
   receiving, by the one or more computer processors, an expiry condition to assign to the first changeset, wherein the expiry condition is based on a specified time duration to expire the first changeset after the time duration is reached;
   responsive to determining that the expiry condition is met, determining, by the one or more computer processors, whether a second changeset identifies a second change to the software product development file which depends on the first change, wherein the second changeset is generated subsequent to generating the first changeset; and
   responsive to determining that the second changeset does not identify the second change which depends on the first change, automatically reversing, by the one or more computer processors, the first change, wherein the first change is not included in the software product development file.

2. The method of claim 1, wherein the second change is dependent on the first change, if at least one or more of: subsequent changesets identify another change to the software product development file or subsequent changesets identify another change to another software product development file that uses information from the first change.

3. The method of claim 1, wherein determining whether the second changeset identifies the second change which depends on the first change comprises:
   determining, by the one or more computer processors, whether the second changeset identifies the second change to another software product development file which uses information from the first change.

4. The method of claim 1 further comprising:
   responsive to determining that the second changeset identifies the second change which depends on the first change, reporting, by the one or more computer processors, that the first change is to be manually reversed.

5. The method of claim 1, wherein the first changeset expires based on one or more of: the time duration elapsed for the first changeset, successful completion of a test for continuous integration system, a second changeset identifying the second change which depends on the first change, or combinations thereof.

6. The method of claim 5 further comprising:
   responsive to determining that the expiry condition is met, updating, by the one or more computer processors, a status of the first changeset to an expiry pending status.

7. The method of claim 1 further comprising:
   receiving, by the one or more computer processors, the first change to the software product development file to generate the first changeset; and
   delivering, by the one or more computer processors, to a component of the SCM environment, the first changeset with the expiry condition, wherein the component is configured to determine whether the first change is to be reversed.

8. A computer program product for managing changes made to software product development files in a source control management (SCM) environment, the computer program product comprising:
   one or more non-transitory computer readable storage media and program instructions stored on the one or more computer readable storage media, the program instructions comprising:
   program instructions to generate a first changeset that identifies a first change to a software product development file;
   program instructions to receive an expiry condition to assign to the first changeset, wherein the expiry condition is based on a specified time duration to expire the first changeset after the time duration is reached;

program instructions to, responsive to determining that the expiry condition is met, determine whether a second changeset identifies a second change to the software product development file which depends on the first change, wherein the second changeset is generated subsequent to generating the first changeset; and program instructions to, responsive to determining that the second changeset does not identify the second change which depends on the first change, automatically reverse the first change, wherein the first change is not included in the software product development file.

9. The computer program product of claim 8, wherein the second change is dependent on the first change, if at least one or more of: subsequent changesets identify another change to the software product development file or subsequent changesets identify another change to another software product development file that uses information from the first change.

10. The computer program product of claim 8, wherein the program instructions to determine whether the second changeset identifies the second change which depends on the first change comprise:

program instructions to determine whether the second changeset identifies the second change to another software product development file which uses information from the first change.

11. The computer program product of claim 8, wherein the program instructions stored on the one or more non-transitory computer readable storage media further comprise:

program instructions to, responsive to determining that the second changeset identifies the second change which depends on the first change, report that the first change is to be manually reversed.

12. The computer program product of claim 8, wherein the the first changeset expires based on one or more of: the time duration elapsed for the first changeset, successful completion of a test for continuous integration system, a second changeset identifying the second change which depends on the first change, or combinations thereof.

13. The computer program product of claim 12, wherein the program instructions stored on the one or more non-transitory computer readable storage media further comprise:

program instructions to, responsive to determining that the expiry condition is met, update a status of the first changeset to an expiry pending status.

14. The computer program product of claim 8, wherein the program instructions stored on the one or more non-transitory computer readable storage media further comprise:

program instructions to receive the first change to the software product development file to generate the first changeset; and program instructions to deliver to a component of the SCM environment, the first changeset with the expiry condition, wherein the component is configured to determine whether the first change is to be reversed.

15. A computer system for managing changes made to software product development files in a source control management (SCM) environment, the computer program product comprising:

one or more computer processors;

one or more non-transitory computer readable storage media;

program instructions stored on the one or more non-transitory computer readable storage media for execution by at least one of the one or more processors, the program instructions comprising:

program instructions to generate a first changeset that identifies a first change to a software product development file;

program instructions to receive an expiry condition to assign to the first changeset, wherein the expiry condition is based on a specified time duration to expire the first changeset after the time duration is reached;

program instructions to, responsive to determining that the expiry condition is met, determine whether a second changeset identifies a second change to the software product development file which depends on the first change, wherein the second changeset is generated subsequent to generating the first changeset; and program instructions to, responsive to determining that the second changeset does not identify the second change which depends on the first change, automatically reverse the first change wherein the first change is not included in the software product development file.

16. The computer system of claim 15, wherein the second change is dependent on the first change, if at least one or more of: subsequent changesets identify another change to the software product development file or subsequent changesets identify another change to another software product development file that uses information from the first change.

17. The computer system of claim 15, wherein the program instructions to determine whether the second changeset identifies the second change which depends on the first change comprise:

program instructions to determine whether the second changeset identifies the second change to another software product development file which uses information from the first change.

18. The computer system of claim 15, wherein the program instructions stored on the one or more non-transitory computer readable storage media further comprise:

program instructions to, responsive to determining that the second changeset identifies the second change which depends on the first change report that the first change is to be manually reversed.

19. The computer system of claim 15, wherein the the first changeset expires based on one or more of: the time duration elapsed for the first changeset, successful completion of a test for continuous integration system, a second changeset identifying the second change which depends on the first change, or combinations thereof.

20. The computer system of claim 19, wherein the program instructions stored on the one or more non-transitory computer readable storage media further comprise:

program instructions to, responsive to determining that the expiry condition is met, update a status of the first changeset to an expiry pending status.

* * * * *